Jan. 4, 1927.

D. R. FEELY 1,613,507

WATER COLLECTING AND SEPARATING ATTACHMENT FOR OIL CANS

Filed March 18, 1925    2 Sheets-Sheet 1

Donovan R. Feely
INVENTOR

BY *Victor J. Evans*
ATTORNEY

WITNESS:

Jan. 4, 1927. 1,613,507
D. R. FEELY
WATER COLLECTING AND SEPARATING ATTACHMENT FOR OIL CANS
Filed March 18, 1925   2 Sheets-Sheet 2
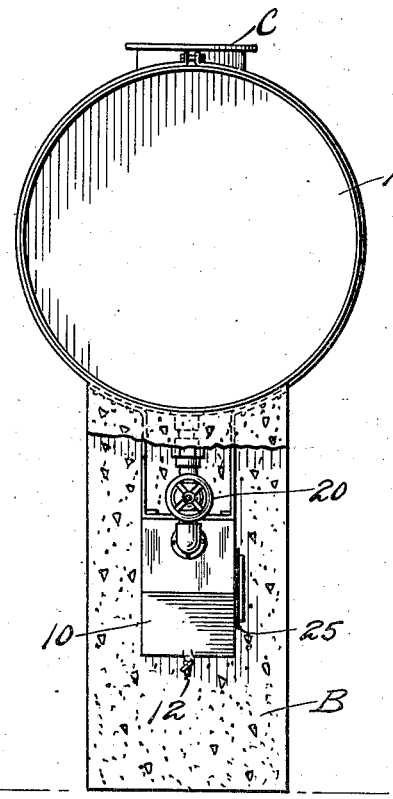
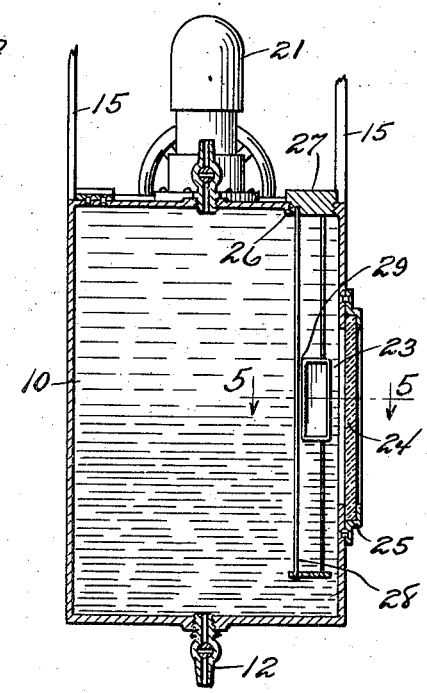
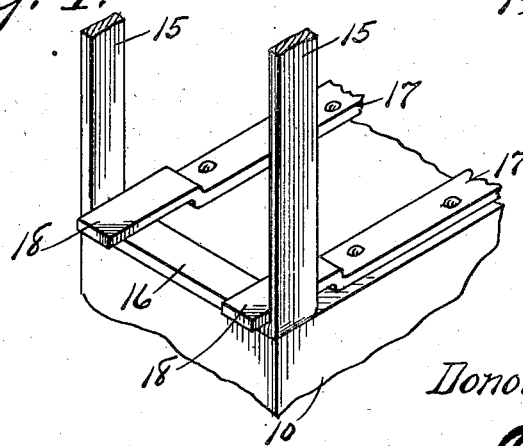
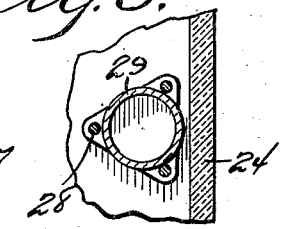
Donovan R. Feely
INVENTOR Patented Jan. 4, 1927.

1,613,507

UNITED STATES PATENT OFFICE.

DONOVAN R. FEELY, OF SHELBYVILLE, MISSOURI.

WATER COLLECTING AND SEPARATING ATTACHMENT FOR OIL CANS.

Application filed March 18, 1925. Serial No. 16,524.

This invention relates to attachments to or accessories for use in connection with storage tanks for oil, gasoline and the like and has for its object the provision of a novel device designed to be interposed in the outlet line from an oil or gasoline storage tank so constructed and arranged as to collect and separate from the oil any water which may be present therein, the advantage being that the oil passing from the attachment will be free from moisture and in proper condition for use or sale.

An important object is the provision of a device of this character which may be associated with a tank without involving any changes in the tank itself, the device being moreover so constructed and arranged that the quantity of water collected therein may be ascertained at any time so that the draining thereof may be accomplished at intervals.

It is well known that in oil and gasoline storage tanks whatever water is present mixed with the oil or gasoline will settle to the bottom of the tank and accumulate therein often to an appreciable depth. It is therefore necessary, under ordinary conditions that the outlet pipe for the oil or other liquid be spaced somewhat above the bottom of the tank in order that the accumulation of water will not pass out with the oil or gasoline drawn off. It is also true that when the water has collected to a considerable depth it is necessary to pump out whatever has settled, an operation which is accomplished from the top of the tank with considerable trouble and labor.

It is with the above facts in view that I have designed the present invention which is located beneath a tank and which is connected with the outlet pipe, the provision of the device permitting the outlet pipe to be led directly from the bottom of the tank instead of from a point above the bottom as is ordinarily the practice.

The invention further contemplates the provision of various details in construction and mounting which will render the device highly efficient, easy to control, durable and a general improvement in the art.

With the above and other objects and advantages in view, the invention consists in the details of construction to be hereinafter more fully described and claimed, and illustrated in the accompanying drawings in which:

Figure 2 is an end elevation, one of the supports of the tank being broken away.

Figure 3 is a vertical section on the line 3—3 of Figure 1, and

Figure 4 is a detail perspective view showing one manner in which the device may be attached to the tank.

Figure 5 is a detail cross sectional view taken on the line 5—5 of Figure 3.

Figure 1:
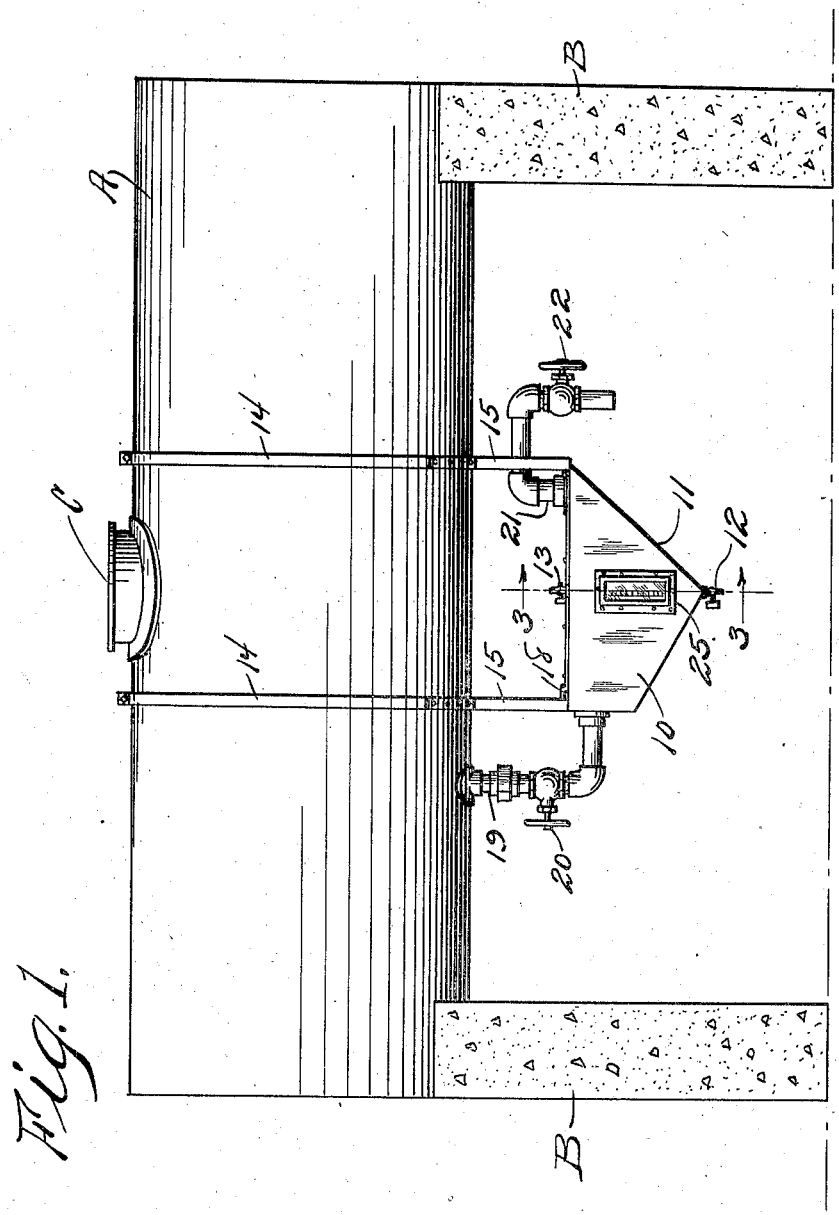
Figure 1 is a side elevation of the device attached to or associated with a storage tank.

Referring more particularly to the drawings, the letter A designates an ordinary storage tank such as used for containing oil, gasoline or the like, and B represents the supports which hold the tank elevated. The tank is of the usual type and is provided with a manhole C.

In carrying out my invention I provide an attachment which consists of a suitable casing 10 of any desired size and shape but which preferably has a tapered bottom 11 at the lowest point of which is provided a drain cock 12. The top of this casing is closed and equipped at some desired point with an air vent or relief cock 13.

While any desired means might be provided for supporting this casing beneath the tank A, I have, in the present instance, illustrated a pair of bands or hooks 14 which embracingly engage the tank and which are formed with downward extensions or arms 15 connected by saddle portions 16 which extend horizontally. The top of the casing 10 may be equipped with a pair of longitudinally extending strips or bars 17 having upwardly offset end portions 18 engaging over and resting upon the bridge portions 16 of the supports. By this means it is evident that the tank or casing 10 is held in place in such manner that it might be detached and removed if such is desired for any reason. Obviously, if it is preferred, any means might be provided for positively securing the casing in place so that it would be incapable of removal.

The numeral 19 designates the oil outlet pipe which leads from the bottom of the tank A into one end of the casing 10, and interposed in this pipe is a suitable control valve 20 by means of which the flow may be cut off when desired. Leading from the top of the casing 10 is a discharge pipe 21 within which is interposed a similar or any preferred control valve 22.

An important feature is the provision of means whereby the level of the water accumulated within the casing 10 may be ascertained. In carrying out this feature, one side of the casing 10 is represented as provided with an opening 23 covered by glass or other transparent material indicated at 24, which glass may be held in place by any desired means such as the frame 25. The top of the casing 10 is preferably provided with an opening 26 normally closed by a plug or cap 27 which carries a depending key 28 extending to a point somewhat near the bottom of the casing. Within this cage is slidably mounted a suitable float 29 of such character and weight that it will sink in oil but float in water. Obviously, the position of the float behind the sight glass 24 will indicate the level of the water which has accumulated within the casing.

In the operation of the device, it will be seen that when both of the valves 20 and 22 are opened, oil will flow from the tank A through the outlet pipe 19 and will pass through the casing 10 and then through the pipe 21 to whatever point should be supplied. Any water in the oil or gasoline will settle to the bottom of the casing 10 while the oil or gasoline will naturally remain at the top and flow out through the pipe 21.

At any time, by glancing through the opening 23, the operator may ascertain the level of the water which has accumulated within the casing 10 and may then drain it out by opening the drain cock 12 and the air vent 13, the valves 20 and 22 being of course closed at this time.

From the foregoing description and a study of the drawings it will be apparent that I have thus provided a simply constructed, inexpensive and easily installed device which will efficiently operate to separate water from oil, gasoline or the like within storage tanks, the construction and arrangement being such that the accumulated water may be drained at any time without disturbing the contents of the tank itself. The device is found to be a great saver of time, labor and annoyance and will also avoid waste of valuable liquids.

While I have shown and described the preferred embodiment of the invention, it should be understood that I reserve the right to make such changes in the construction, form and arrangement of the parts as will not depart from the spirit of the invention or the scope of the subjoined claims.

Having thus described the invention, I claim:

1. A water collecting, separating and removing attachment for an oil tank, comprising a casing having its bottom converging downwardly from opposite sides, a drain cock at the lowest point of the bottom, a valved pipe connected with the tank at the bottom thereof and leading into the upper portion of said casing, a valved outlet pipe connected with the top of the casing, and means carried by the tank for supporting the casing therebeneath whereby to avoid the bringing of strain upon said first named pipe and its connections with the tank and casing.

2. A water collecting, separating and drain-off attachment for hydro-carbon storage tanks comprising a casing provided in its bottom with a drain cock, a valved inlet connection to the casing from the tank, a valved outlet pipe leading from the top of the casing, and means for supporting the casing beneath the tank comprising a pair of bands embracingly engaged upon the tank and each formed with depending U-shaped portions located beneath the tank, and a plurality of spaced cleats on the top of the casing having their ends engaged with the bight portions of said U-shaped portions.

3. In a water collecting, separating and drain-off attachment for hydro-carbon storage tanks, a casing having a drain cock at its lowest point and an air vent at its uppermost point, an inlet pipe to the casing connected to the lowermost point of the tank, a valved outlet pipe leading from the top of the casing, a pair of U-shaped members depending beneath the tank, and a pair of cleats secured upon the top of the casing and having upwardly offset ends hooked over the bight portions of said U-shaped members.

In testimony whereof I affix my signature.

DONOVAN R. FEELY.